United States Patent
Lim et al.

(10) Patent No.: US 10,594,891 B2
(45) Date of Patent: Mar. 17, 2020

(54) AUTOMATIC LOGOUT METHOD USING BLUETOOTH LOW ENERGY COMMUNICATION AND IMAGE FORMING APPARATUS FOR EXECUTING SAME

(71) Applicant: HP Printing Korea Co., Ltd., Suwon-si, Gyeonggi-do (KR)

(72) Inventors: Mok-Hwa Lim, Suwon-si (KR); Hakju Lee, Suwon-si (KR); Kangyub Kim, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/257,767

(22) Filed: Jan. 25, 2019

(65) Prior Publication Data

US 2019/0191053 A1    Jun. 20, 2019

Related U.S. Application Data

(63) Continuation of application No. PCT/KR2017/000079, filed on Jan. 4, 2017.

(30) Foreign Application Priority Data

Aug. 4, 2016  (KR) .................. 10-2016-0099621

(51) Int. Cl.
| | | |
|---|---|---|
| *H04N 1/327* | (2006.01) | |
| *H04B 17/26* | (2015.01) | |
| *H04B 17/318* | (2015.01) | |
| *G06F 21/35* | (2013.01) | |
| *H04Q 9/04* | (2006.01) | |
| *H04N 1/00* | (2006.01) | |
| *H04N 1/44* | (2006.01) | |
| *H04W 4/80* | (2018.01) | |
| *G06F 21/31* | (2013.01) | |

(52) U.S. Cl.
CPC ......... *H04N 1/32786* (2013.01); *G06F 21/35* (2013.01); *H04B 17/26* (2015.01); *H04B 17/318* (2015.01); *H04N 1/00405* (2013.01); *H04N 1/4433* (2013.01); *H04Q 9/04* (2013.01); *G06F 21/31* (2013.01); *H04N 2201/0094* (2013.01); *H04W 4/80* (2018.02)

(58) Field of Classification Search
CPC ............................ H04N 1/32786; H04B 17/26
See application file for complete search history.

(56) References Cited

U.S. PATENT DOCUMENTS

| | | |
|---|---|---|
| 2005/0176442 A1 | 8/2005 | Ju et al. |
| 2005/0213542 A1 | 9/2005 | Guo et al. |
| 2016/0066137 A1 | 3/2016 | Kulkarni et al. |
| 2017/0134609 A1* | 5/2017 | Park ................... H04N 1/00278 |

FOREIGN PATENT DOCUMENTS

| | | |
|---|---|---|
| JP | 2016-66217 A | 4/2016 |
| KR | 10-2004-0019681 A | 3/2004 |
| KR | 10-2016-0028368 A | 3/2016 |

* cited by examiner

*Primary Examiner* — Lennin R Rodriguezgonzalez
(74) *Attorney, Agent, or Firm* — Jefferson IP Law, LLP

(57) ABSTRACT

An apparatus and a method are provided. The method includes measuring, by a mobile terminal, a signal strength of advertising packets broadcast by an image forming apparatus, determining whether the measured signal strength decreases for at least a preset period of time, and, when the signal strength decreases for at least the preset period of time, transmitting a logout request to the image forming apparatus.

15 Claims, 16 Drawing Sheets

FIG. 8

| TIME | 0.20 | 0.40 | 0.60 | 0.80 | 1.00 | 1.20 | 1.40 | 1.60 | 1.80 | 2.00 | 2.20 | 2.40 | 2.60 | 2.80 | 3.00 | 3.20 | 3.40 | 3.60 | 3.80 | 4.00 | 4.20 | 4.40 | 4.60 | 4.80 | 5.00 |
|---|---|---|---|---|---|---|---|---|---|---|---|---|---|---|---|---|---|---|---|---|---|---|---|---|---|
| | 1sec | | | | 2sec | | | | | 3sec | | | | | 4sec | | | | | 5sec | | | | | |
| RSSI | −60 | −10 | −57 | −59 | −58 | −100 | −10 | −62 | −66 | −64 | −100 | −65 | −69 | −10 | −67 | −10 | −80 | −60 | −90 | −70 | −90 | −76 | −5 | −74 | −75 |
| REPRESENTATIVE VALUES | −58 | | | | −64 | | | | | −64 | | | | | −70 | | | | | −75 | | | | | |

AUTOMATIC LOGOUT METHOD USING BLUETOOTH LOW ENERGY COMMUNICATION AND IMAGE FORMING APPARATUS FOR EXECUTING SAME

BACKGROUND

Through Bluetooth Low Energy (BLE) communication, an image forming apparatus may engage in one-to-one communication with a mobile terminal, and a user may be logged in to the image forming apparatus by using the mobile terminal. When the user is logged in to the image forming apparatus by using the mobile terminal, there should be provided an appropriate logout method that prevents the user from involuntarily staying logged in.

BRIEF DESCRIPTION OF THE DRAWINGS

The above and other aspects, features, and advantages of certain examples of the disclosure will be more apparent from the following description taken in conjunction with the accompanying drawings, in which:

FIGS. 8 and 9 show methods of performing an automatic logout when a signal strength of advertising packets decreases for a certain period of time, according to various examples.

Throughout the drawings, it should be noted that like reference numbers are used to depict the same or similar elements, features, parts, components, and structures and thus, a repeated description thereof may be omitted.

DETAILED DESCRIPTION

Various examples will be provided more fully hereinafter with reference to the attached drawings. The examples below may be modified in many different forms. For clarity of explanation, matters that are well known to one of ordinary skill in the art to which examples below pertain will not be described in detail.

It will be understood that when an element is referred to as being "connected to" another element, the elements may be "directly connected" or may be "indirectly (e.g., electrically) connected" wherein still another element or intervenes. It will be further understood that the terms "comprises" and/or "includes" used herein specify the presence of stated features or components, but do not preclude the presence or addition of one or more other features or components, unless otherwise defined.

In the present specification, the expression "image forming job" may denote an image-related job (e.g., printing, copying, scanning, or faxing) such as forming images, generating, storing, transmitting, etc. image files, and the term "job" may indicate an image forming job as well as a series of processes necessarily conducted to perform the image forming job.

Also, an "image forming apparatus" may be any device, for example, a printer, a copier, a scanner, a fax machine, a multi-function printer (MFP), and a display device, which can perform an image forming job.

Also, a "hard copy" may indicate a job of printing an image on a print medium such as paper, and a "soft copy" may indicate a job of printing an image on a display device such as a television (TV) or a monitor, or on a memory.

Also, "content" may be any type of data that is a target of an image forming job, for example, a picture, an image, a document file, etc.

Also, "print data" may be data converted into a format printable by a printer.

Also, a "scan file" may be a file generated by a scanner after scanning an image.

Also, a "user" may be a person who uses an image forming apparatus or a device connected to an image forming apparatus in a wired or wireless manner and conducts jobs related to image forming jobs. In addition, an "administrator" may be a person who has authority to access all functions of an image forming apparatus and a system. The "user" and the "administrator" may be the same person.

Figure 1:
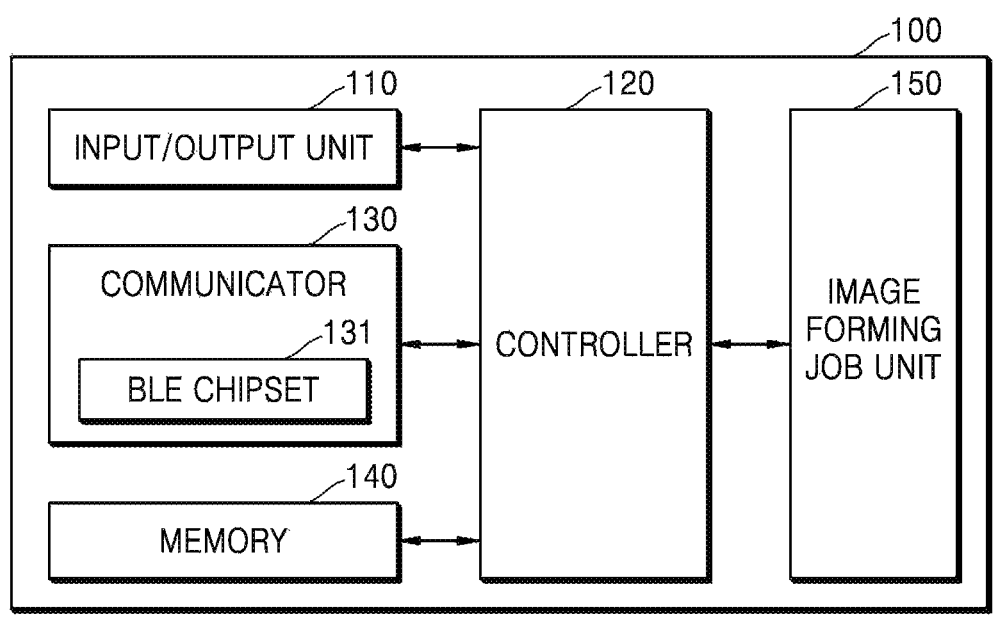
FIG. 1 shows an image forming apparatus, according to an example.

FIG. 1 shows a structure of an image forming apparatus, according to an example.

Referring to FIG. 1, an image forming apparatus 100 according to an example may include an input/output unit 110, a controller 120, a communicator 130, a memory 140, and an image forming job unit 150. Also, although not shown, the image forming apparatus 100 may further include a power supply that supplies power to each component.

The input/output unit 110 may include an input unit, which receives an input, etc. of performing an image forming job from a user, and an output unit which displays a result of performing the image forming job and information such as a state of the image forming apparatus 100. For example, the input/output unit 110 may include an operation panel receiving a user input, a display panel displaying a screen, and the like.

For example, the input unit may include one or more device capable of receiving various types of user inputs, for example, a keyboard, a physical button, a touch screen, a camera, a microphone, and the like. Also, the output unit may include, for example, a display panel, a speaker, or the like. However, the present disclosure is not limited thereto. The input/output unit 110 may include a device supporting various inputs and outputs.

The controller 120 may control an operation of the image forming apparatus 100 and may include a processor such as a central processing unit (CPU). The controller 120 may control other components included in the image forming apparatus 100 to allow the other components to perform jobs corresponding to the user inputs received by the input/output unit 110.

For example, the controller 120 may execute programs stored in the memory 140, read files stored in the memory 140, or store new files in the memory 140.

In examples described herein, control operations (e.g., authentication performance, generation of a unique identification (ID), a change in advertising packet data, checking intervals of receiving response packets, etc.) performed by the image forming apparatus 100 may be performed as the controller executes the programs stored in the memory 140.

The communicator 130 may communicate with other devices or a network in a wired or wireless manner. To this end, the communicator 130 may include a communication module (e.g., transceiver) supporting at least one of various wired/wireless communication methods. For example, the communication module may be in a form of a chipset or may be a sticker/barcode/etc. (e.g., a sticker including a Near Field Communication (NFC tag)) including information necessary for communication.

The wireless communication may include, for example, at least one of Wireless Fidelity (Wi-Fi), Wi-Fi Direct, Bluetooth, Bluetooth Low Energy (BLE), Ultra-Wide Band (UWB), NFC, and the like. The wired communication may include, for example, at least one of a universal serial bus (USB), a high definition multimedia interface (HDMI), and the like. In the present example, the image forming apparatus 100 may support BLE communication, and thus, the communicator 130 may include a BLE chipset 131. The BLE chipset 131 may broadcast advertising packets and may receive, from an external device, response packets responding to the advertising packets.

The communicator 130 may be connected to a mobile terminal outside the image forming apparatus 100 and may receive/transmit signals and/or data.

Figure 2:
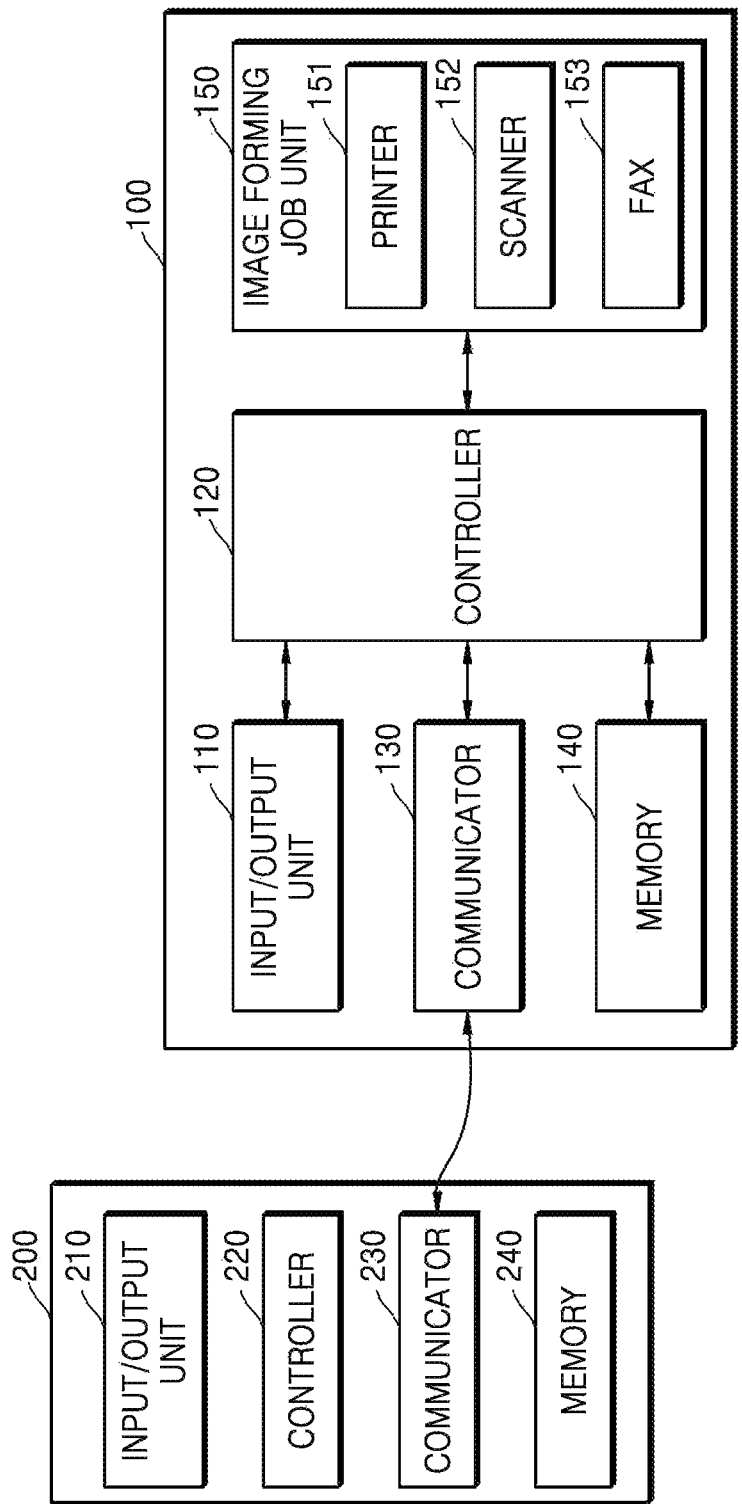
FIG. 2 shows an environment in which an image forming apparatus is connected to a mobile terminal, according to an example.

FIG. 2 shows an environment in which an image forming apparatus is connected to a mobile terminal, according to an example.

Referring to FIG. 2, the image forming apparatus 100 is connected to a mobile terminal 200 through the communicator 130. The communicator 130 may transmit, to the controller 120, the signals or data received from the mobile terminal 200 or may transmit signals or data generated by the controller 120 to the mobile terminal 200. For example, when the communicator 130 receives a print instruction signal and print data from the mobile terminal 200, the controller 120 may output the received print data by using a printer 151.

As shown in FIG. 2, the mobile terminal 200 may include an input/output unit 210, a controller 220, a communicator 230, and a memory 240. The controller 220 may execute programs stored in the memory 240 and transmit signals or data, which is generated due to the execution of the programs, to the image forming apparatus 100 through the communicator 230, thus being capable of controlling an image forming job.

In examples provided herein, control operations (e.g., comparison of unique IDs, measurement of a signal strength of advertising packets, determination of a representative value, etc.) performed by the mobile terminal 200 may be performed as the controller 220 executes the programs stored in the memory 240.

The mobile terminal 200 may include, for example, a smart phone, a tablet computer, a personal computer (PC), home appliances, medical equipment, a camera, a wearable device, or the like.

Referring back to FIG. 1, in the memory 140, programs such as applications may be installed and various types of data such as files may be stored. The controller 120 may access and use the data stored in the memory 140 or may store new data in the memory 140. Also, the controller 120 may execute the programs installed in the memory 140. In addition, the controller 120 may install, in the memory 140, applications received from the outside through the communicator 130.

The image forming job unit 150 may perform an image forming job such as printing, copying, scanning, or faxing. For example, when a user who is successfully logged in to the image forming apparatus 100 requests performance of the image forming job, the image forming job unit 150 may perform the job according to an instruction from the controller 120. The image forming job unit 150 includes the printer 151, a scanner 152, and a fax 153. However, according to necessity, the image forming job unit 150 may include only some of the printer 151, the scanner 152, and the fax 153 or may further include an element that performs another image forming job.

Hereinafter, various examples will be described with reference to FIGS. 1 and 2 and FIGS. 3 to 16.

Figure 3:
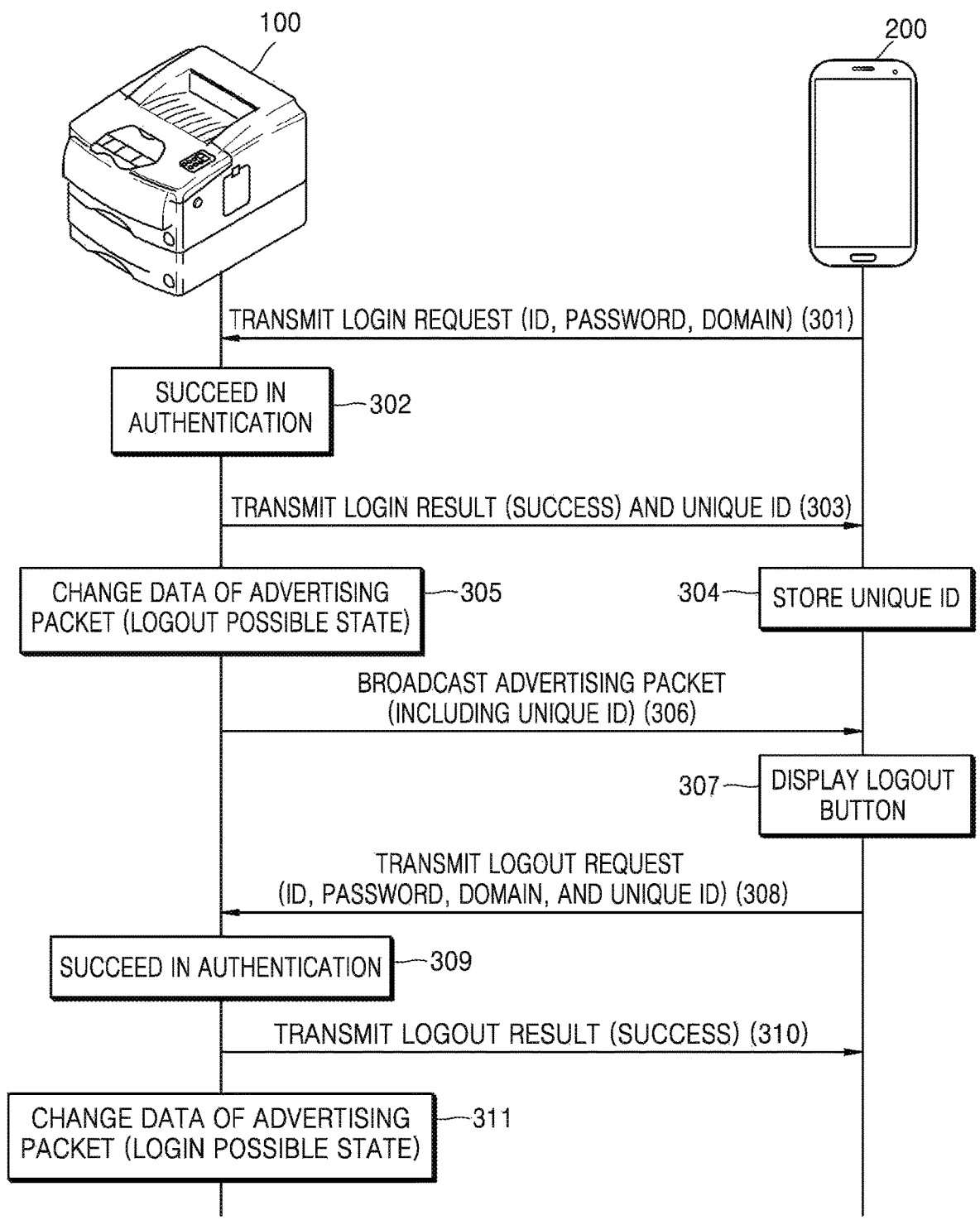
FIG. 3 shows a process in which a logout button is provided in a mobile terminal, according to an example.

FIG. 3 shows a process in which a logout button is provided in a mobile terminal, according to an example.

Referring to FIG. 3, in operation 301, the mobile terminal 200 transmits a login request to the image forming apparatus 100. In an example, the mobile terminal 200 may transmit a login request via BLE communication or another type of peer-to-peer (P2P) communication. Also, in an example, the login request may include information about a user ID, a password, a domain, etc., that is, login information.

In operation 302, authentication is performed based on the received login information and it is determined if the authentication succeeds. If the authentication succeeds, the controller 120 of the image forming apparatus 100 transmits a login result (i.e., success) and a unique ID to the mobile terminal 200 in operation 303. In an example, the unique ID may include information used to identify the image forming apparatus 100 and may only include information that does not overlap identification information of another device. The controller 120 of the image forming apparatus 100 may generate a unique ID by using a serial number, a MAC address, a hash value, or the like.

In operation 304, the controller 220 of the mobile terminal 200 stores the received unique ID in the memory 240.

In operation 305, the controller 120 of the image forming apparatus 100 changes data of advertising packets. For example, the advertising packet may include state information of the image forming apparatus 100, and since the login succeeds, the controller 120 changes the state information to a "log out possible state." Therefore, external devices receiving the advertising packets may verify that there is a user who already logged in the image forming apparatus 100.

In operation 306, the controller 120 of the image forming apparatus 100 broadcasts the advertising packets and the unique ID by using the BLE chipset 131. In this case, the unique ID may be included in the advertising packets or may be broadcast along with the advertising packets as a separate packet.

In operation 307, the controller 220 of the mobile terminal 200 displays, on a screen of the input/output unit 210, the logout button when certain conditions are satisfied after the state information of the advertising packets and the unique ID are determined. For example, the controller 220 may determine whether the state information of the advertising packets is in a "logout possible state." When the state information is in the "logout possible state," the received unique ID is compared to the unique ID stored in the memory 240. When the received unique ID is identical to the unique ID stored in the memory 240, the logout button is displayed on the screen.

When the user selects the logout button on the mobile terminal 200, the controller 220 of the mobile terminal 200 transmits a logout request to the image forming apparatus 100 in operation 308. In this case, the logout request may include logout information including, for example, a user ID, a password, a domain, a unique ID, and the like.

In operation 309, the controller 120 of the image forming apparatus 100 performs authentication based on the received logout information, and when the authentication succeeds, the controller 120 transmits a logout result (i.e., success) to the image forming apparatus 100 in operation 310.

In operation 311, the controller 120 of the image forming apparatus 100 changes the data of the advertising packets. For example, the controller 120 may change the state information included in the advertising packets to a "login passible state." Alternatively, when the logout succeeds, instead of immediately changing the state information to the "login possible state," the controller 120 may wait for a certain period of time and change the state information to the "login possible state."

Generally, when login succeeds, the image forming apparatus 100 does not transmit the unique ID to the mobile terminal 200, and also, when the advertising packets are broadcast, the unique ID is not broadcast together with the advertising packets. Thus, although the mobile terminal 200 receives the advertising packets, there is no way to determine whether the advertising packets are from the image forming apparatus 100 that the user is logged into by using the mobile terminal 200. Accordingly, a direct logout may not be supported by the mobile terminal 200. However, in the above example, the mobile terminal 200 displays the logout button on the screen by using the unique ID, and the user selects the logout button. Thus, a direct logout may be performed on the mobile terminal 200.

Hereinafter, examples of operations performed respectively by the image forming apparatus 100 and the mobile terminal 200 will be described with reference to FIGS. 4 and 5.

Figure 4:
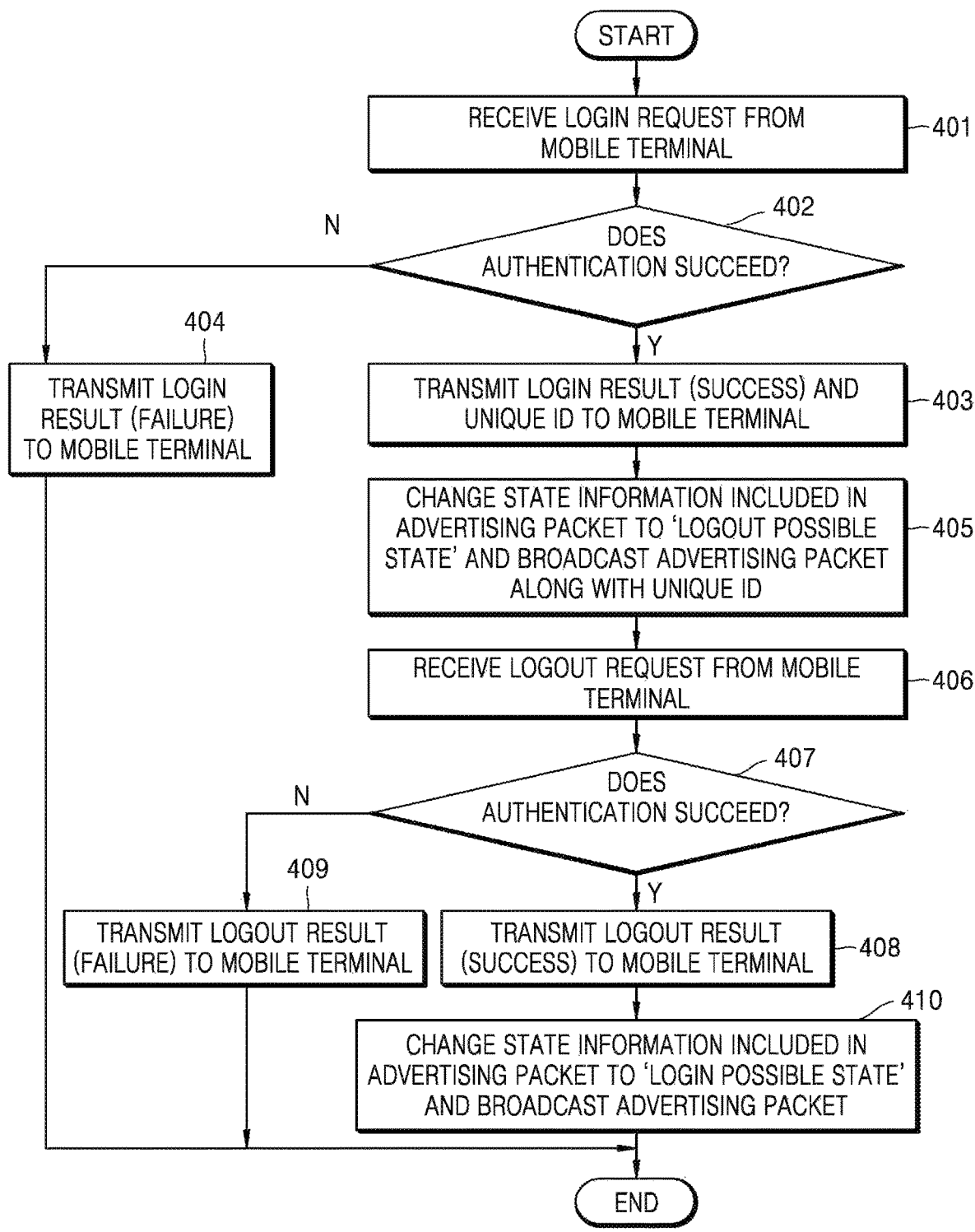
FIG. 4 is a flowchart of operations performed by an image forming apparatus to provide a logout button in a mobile terminal, according to an example.

FIG. 4 is a flowchart of operations performed by an image forming apparatus to provide a logout button in a mobile terminal, according to an example.

Referring to FIG. 4, in operation 401, the image forming apparatus receives a login request from the mobile terminal. In operation 402, the image forming apparatus performs authentication based on received login information and determines whether the authentication succeeds. When the authentication fails, operation 404 is performed, and the image forming apparatus transmits a login result (i.e., failure) to the mobile terminal. However, when the authentication succeeds, operation 403 is performed, and the image forming apparatus transmits the login result (i.e., success) and the unique ID to the mobile terminal.

In operation 405, the image forming apparatus changes state information included in the advertising packets to a "logout possible state" and broadcasts the advertising packets along with the unique ID.

When the image forming apparatus receives a logout request from the mobile terminal in operation 406, the image forming apparatus performs authentication based on received logout information in operation 407. As a result of authentication, when the authentication fails, operation 409 is performed, and the image forming apparatus transmits a logout result (i.e., failure) to the mobile terminal. However, when the authentication succeeds, operation 408 is performed, and the image forming apparatus transmits a logout result (i.e., success) to the mobile terminal.

In operation 410, the image forming apparatus changes the state information included in the advertising packets to the "login possible state" and then broadcasts the advertising packets.

Figure 5:
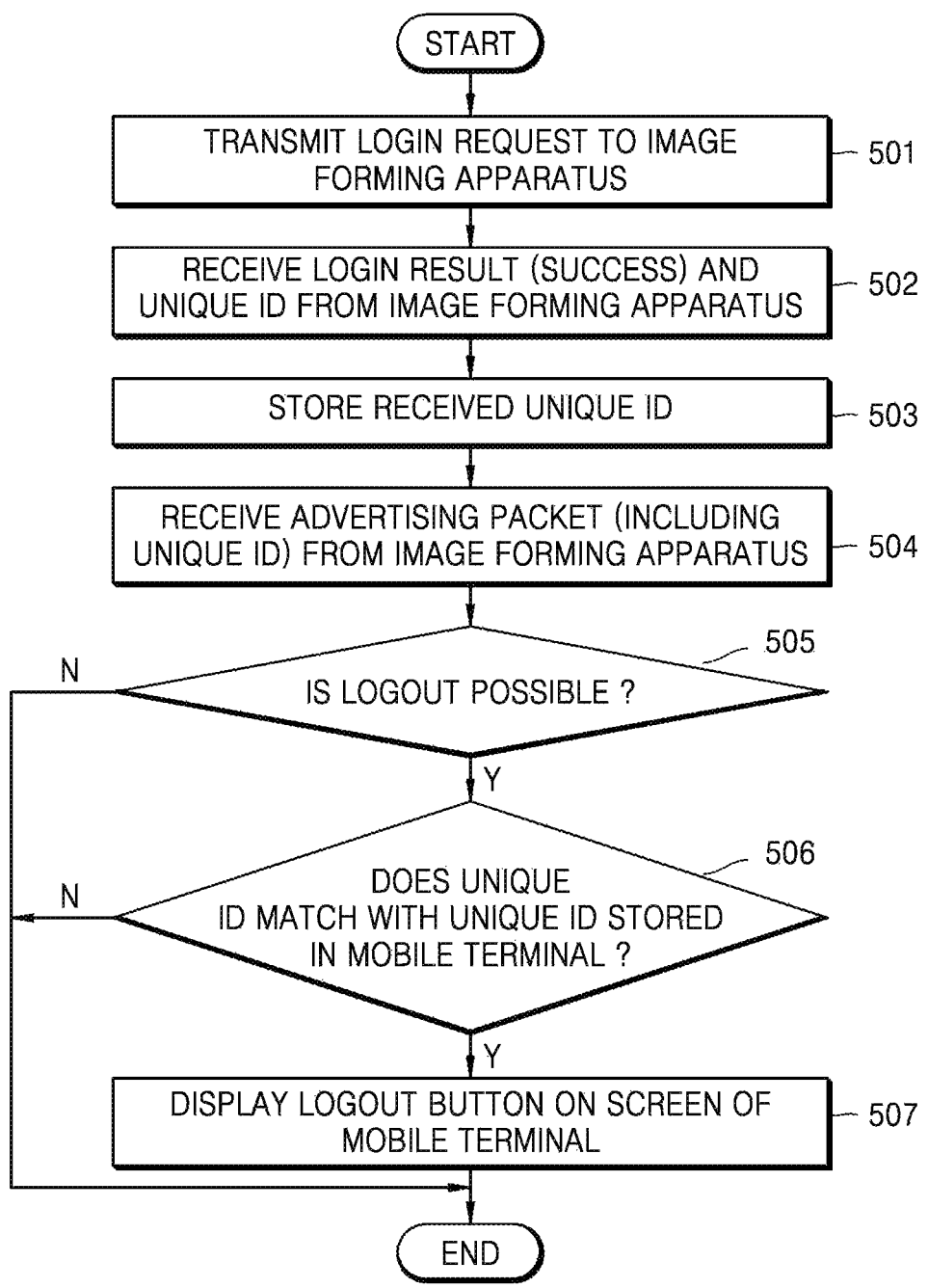
FIG. 5 is a flowchart of operations performed by a mobile terminal to provide a logout button in the mobile terminal, according to an example.

FIG. 5 is a flowchart of operations performed by a mobile terminal to provide a logout button in the mobile terminal, according to an example.

Referring to FIG. 5, in operation 501, the mobile terminal transmits a login request to the image forming apparatus.

In operation 502, the mobile terminal receives a login result (i.e., success) and a unique ID from the image forming apparatus and in operation 503, the mobile terminal stores the received unique ID.

In operation 504, the mobile terminal receives advertising packets broadcast by the image forming apparatus. In this case, the advertising packets may include state information and the unique ID.

In operation 505, the mobile terminal checks the state information included in the advertising packets and determines whether the mobile terminal is in a logout possible state. As a result of the determination, when the mobile terminal is in the logout possible state, operation 506 is performed, and the mobile terminal determines whether the unique ID included in the advertising packets is identical to the unique ID stored in the mobile terminal.

As a result of the determination, when the unique ID included in the advertising packets is identical to the unique ID stored in the mobile terminal, the mobile terminal displays the logout button on the screen, in operation 507.

Hereinafter, examples in which an automatic logout is performed based on a signal strength of the advertising packets received by the mobile terminal will be described with reference to FIGS. 6 to 11.

Figure 6:
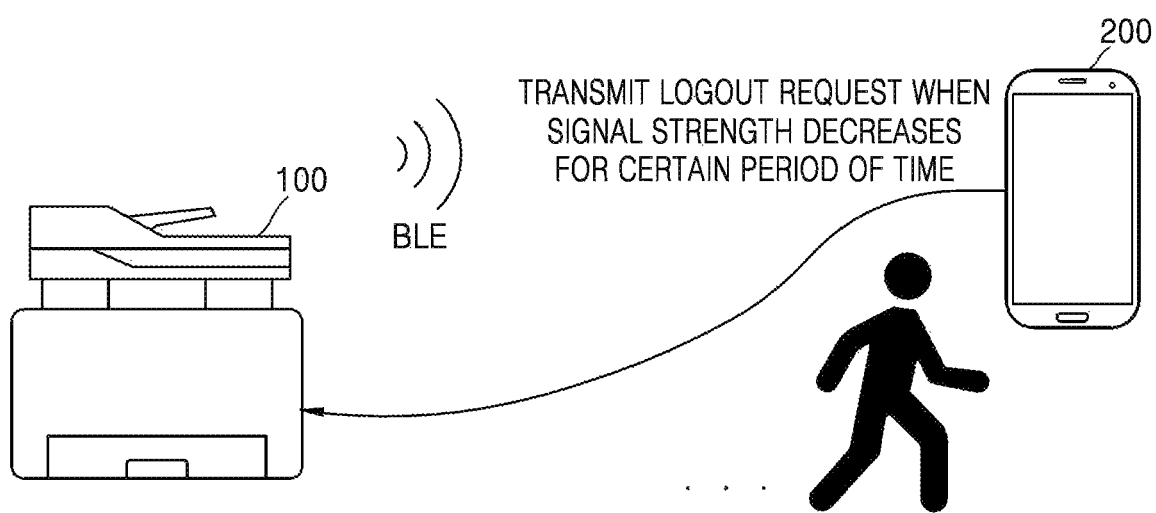
FIG. 6 shows a method of performing an automatic logout according to a signal strength of advertising packets, according to an example.

FIG. 6 shows a method of performing an automatic logout according to a signal strength of advertising packets, according to an example.

Referring to FIG. 6, the image forming apparatus 100 periodically broadcasts the advertising packets. As a distance from the image forming apparatus 100 to the mobile terminal 200 increases, the signal strength of the advertising packets that is detected by the mobile terminal 200 decreases. Therefore, the mobile terminal 200 measures the signal strength of the advertising packets, and if the measured signal strength satisfies certain conditions, the mobile terminal 200 may transmit a logout request to the image forming apparatus 100.

The signal strength may be affected by a distance between the image forming apparatus 100 and the mobile terminal 200 and various other factors. For example, when the user puts the mobile terminal 200 in his/her pocket, the signal strength may suddenly decrease, and even when a direction of the mobile terminal 200 changes, the signal strength may suddenly increase or decrease. Therefore, when a logout is performed when the signal strength simply decreases, the logout may be erroneously performed in addition to a case where a distance between the mobile terminal 200 and the image forming apparatus 100 increases. In order to increase the accuracy, the logout may be performed when the signal strength decreases for a certain period of time as in examples described below.

Figure 7:
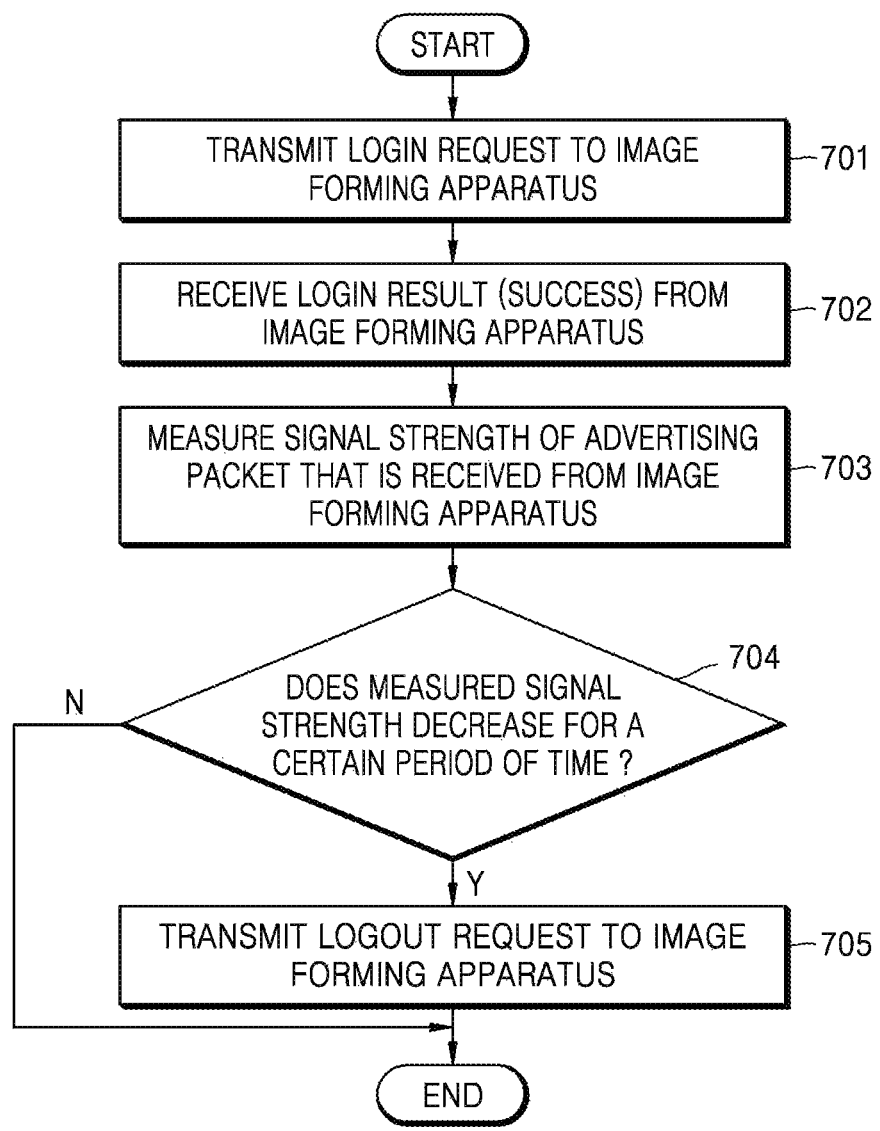
FIG. 7 is a flowchart of operations performed by a mobile terminal to perform an automatic logout according to a signal strength of advertising packets, according to an example.

FIG. 7 is a flowchart of operations performed by a mobile terminal to perform an automatic logout according to a signal strength of advertising packets, according to an example.

Referring to FIG. 7, in operation 701, the mobile terminal transmits a login request to an image forming apparatus. In operation 702, the mobile terminal receives a login result (i.e., success) from the image forming apparatus.

When the login succeeds, in operation 703, the mobile terminal measures the signal strength of the advertising packets received from the image forming apparatus.

In operation 704, the mobile terminal determines whether the measured signal strength decreases for a certain period of time. In this case, the certain period of time that is a reference may be appropriately set according to different situations. Examples of determining whether the signal strength decreases for a certain period of time will be described with reference to FIGS. 8 to 10.

When it is determined that the signal strength decreases for a certain period of time, in operation 705, the mobile terminal transmits a logout request to the image forming apparatus. In this case, when conditions in operation 704 are satisfied, the mobile terminal may automatically transmit the logout request to the image forming apparatus. Alternatively, when the conditions in operation 704 are satisfied, the mobile terminal may display, on a screen of the mobile terminal, an inquiry asking whether to perform logout, and when the user selects the logout through the inquiry, the mobile terminal may transmit the logout request to the image forming apparatus.

Hereinafter, an example of determining a sampling rate and a representative value of the signal strength to measure the signal strength and determine whether the signal strength increases or decreases will be described.

Figure 9:
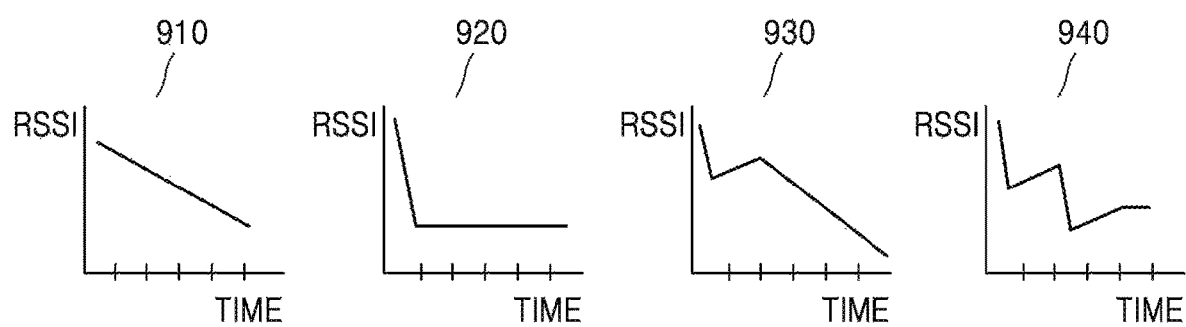

FIGS. 8 and 9 show methods of performing an automatic logout when a signal strength of advertising packets decreases for a certain period of time, according to various examples.

The table of FIG. 8 shows a signal strength measured in a time unit and a representative value of every second, according to an example.

Referring to FIG. 8, the mobile terminal specifies a signal strength of the advertising packets at a sampling rate of 5 Hz. The sampling rate may be set as an appropriate value, according to different situations. The mobile terminal determines representative values with respect to a preset cycle after measuring the signal strength, and FIG. 8 shows an example in which the representative values are determined per second.

Referring to FIG. 8, a minimum value and a maximum value are excluded from five measurement values determined every second, and a value obtained by averaging the remaining three measurement values is determined as a representative value. The representative values that are determined in the aforementioned manner are shown in FIG. 8. Methods of determining representative values may vary. For example, all of the measurement values included in every second may be averaged, or a median of the measurement values included in every second may be selected. Other than the above-described methods, values having representativeness may be determined.

When the representative values of the signal strength of every second are determined, the mobile terminal determines whether the representative values of the signal strength decrease for a certain period of time. For example, when the certain period of time is equal to 3 seconds, the mobile terminal determines whether the representative values of the signal strength decrease for 3 seconds.

Referring to FIG. 8, since the representative values of the signal strength decrease for five seconds, the mobile terminal may determine that conditions are satisfied and may transmit a logout request to the image forming apparatus.

FIG. 9 illustrates graphs showing different examples.

Referring to the graphs of FIG. 9, in graph 910, since the signal strength decreases continuously, the mobile terminal may determine that the conditions are satisfied and may transmit a logout request to the image forming apparatus.

In graph 920, the signal strength dramatically decreases for the first 1 second, but then the signal strength remains constant. Thus, the signal strength does not decrease for a certain period of time (e.g., 3 seconds). Therefore, the mobile terminal does not transmit the logout request.

In graph 930, the signal strength decreases first, then increases, and then decreases for a certain period of time (e.g., 3 seconds). Thus, the mobile terminal determines that the conditions are satisfied and transmits the logout request to the image forming apparatus.

In graph 940, since the signal strength repeatedly decreases and increases, the mobile terminal determines that the conditions are not satisfied and thus does not transmit the logout request.

Figure 10:
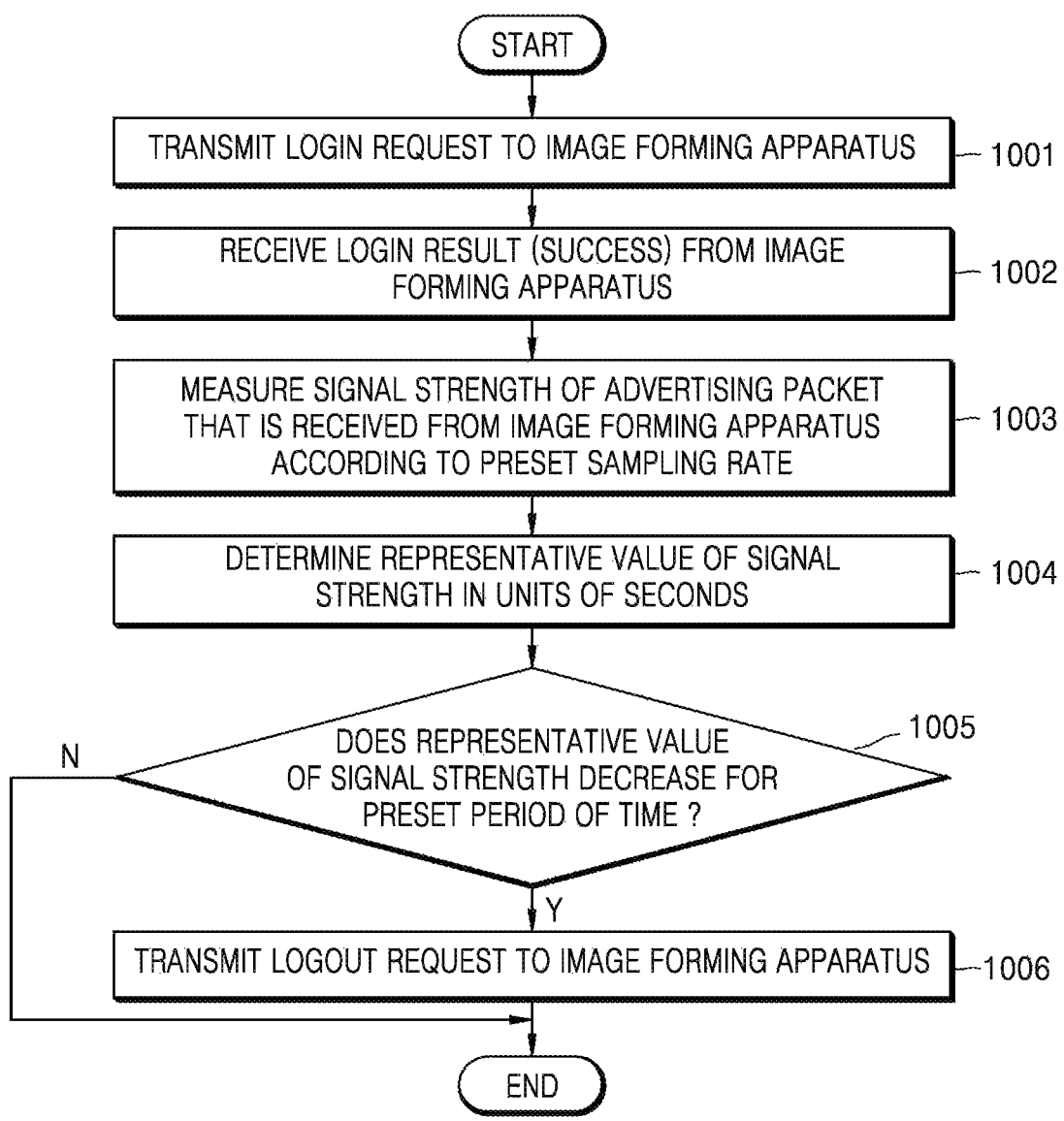
FIG. 10 is a flowchart of operations performed by a mobile terminal to perform an automatic logout when a signal strength of advertising packets decreases for a certain period of time, according to an example.

FIG. 10 is a flowchart of operations performed by a mobile terminal to perform an automatic logout when a signal strength of advertising packets decrease for a certain period of time, according to an example.

Referring to FIG. 10, in operation 1001, the mobile terminal transmits a login request to the image forming apparatus, and in operation 1002, the mobile terminal receives a login result (i.e., success) from the image forming apparatus.

In operation 1003, the mobile terminal may receive the advertising packets broadcast by the image forming apparatus and measure the signal strength of the received advertising packets according to a preset sampling rate. In operation 1004, the mobile terminal may determine representative values of the signal strength in units of seconds.

In operation 1005, the mobile terminal determines whether the representative values of the signal strength decrease for a certain period of time. As a result of the determination, when the representative values of the signal strength decrease for a certain period of time, the mobile terminal may transmit a logout request to the image forming apparatus in operation 1006.

An automatic logout may be performed by considering acceleration of the mobile terminal in addition to the signal strength. An example corresponding to the above automatic logout is shown in FIG. 11.

Figure 11:
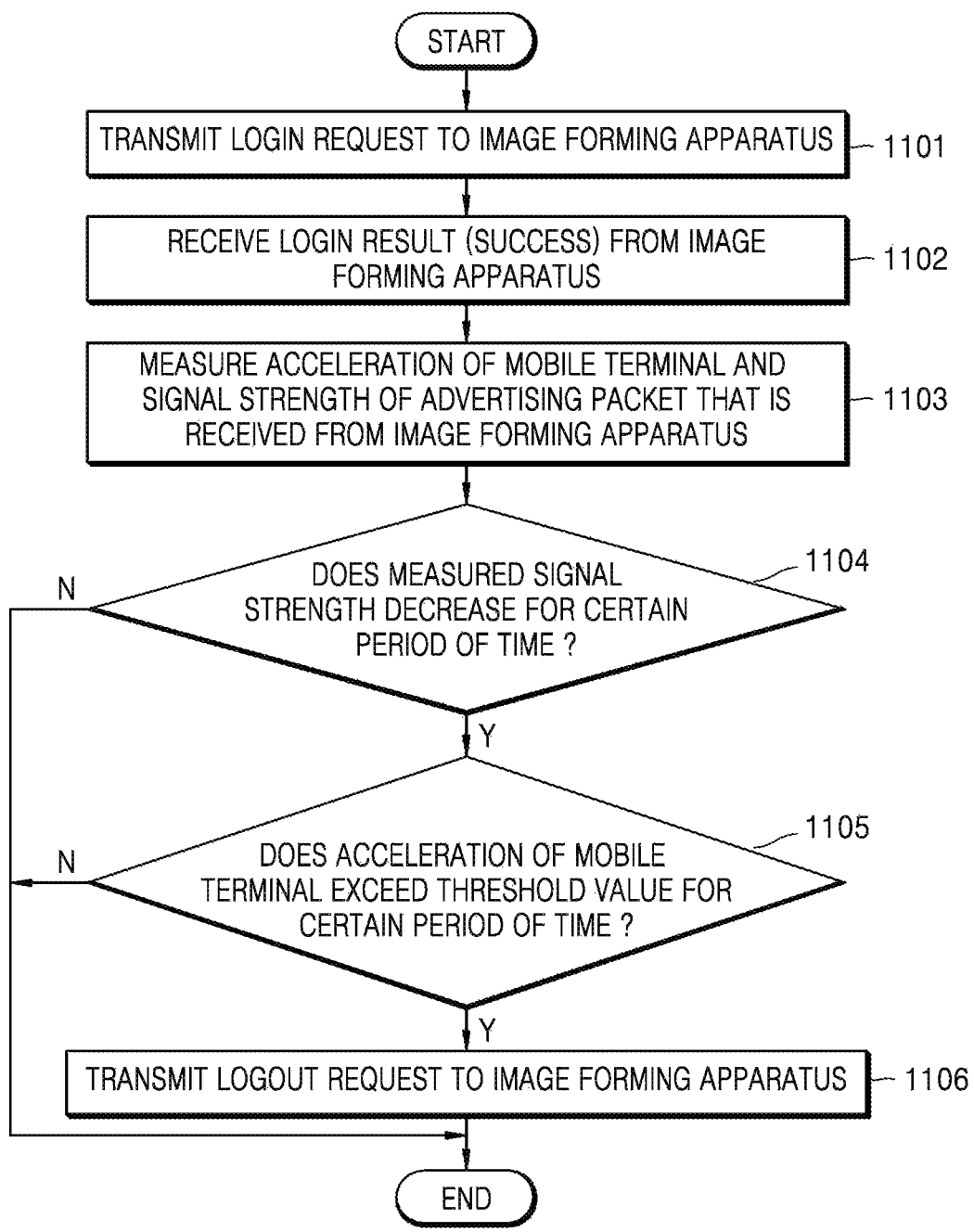
FIG. 11 is a flowchart of operations performed by a mobile terminal to perform an automatic logout according to a signal strength of advertising packets and an acceleration size of the mobile terminal, according to an example.

FIG. 11 is a flowchart of operations performed by a mobile terminal to perform an automatic logout according to a signal strength of advertising packets and an acceleration size of the mobile terminal, according to an example.

Referring to FIG. 11, in operation 1101, the mobile terminal transmits a login request to the image forming apparatus, and in operation 1102, the mobile terminal receives a login result (i.e., success) from the image forming apparatus.

In operation 1103, the mobile terminal measures the acceleration of the mobile terminal and the signal strength of the advertising packets received from the image forming apparatus. The acceleration of the mobile terminal may be measured by using an acceleration sensor, a gyroscope sensor, etc. of the mobile terminal.

In operation 1104, the mobile terminal determines whether the measured signal strength decreases for a certain period of time. As a result of the determination, when the representative values of the signal strength decrease for a certain period of time, operation 1105 is performed, and the mobile terminal determines whether the acceleration of the mobile terminal exceeds a threshold value for a certain period of time. As a result of the determination regarding acceleration, when the acceleration exceeds the threshold value for a certain period of time, the mobile terminal may transmit a logout request to the image forming apparatus in operation 1106.

The accuracy may be improved by considering the signal strength as well as the acceleration of the mobile terminal. For example, when the user carries the mobile terminal and moves further from the image forming apparatus, the acceleration of the mobile terminal may be highly likely to increase due to the movement of the user.

Otherwise, the automatic logout may be performed by considering only the acceleration of the mobile terminal. Examples corresponding to this case are shown in FIGS. 12 and 13.

Figure 12:
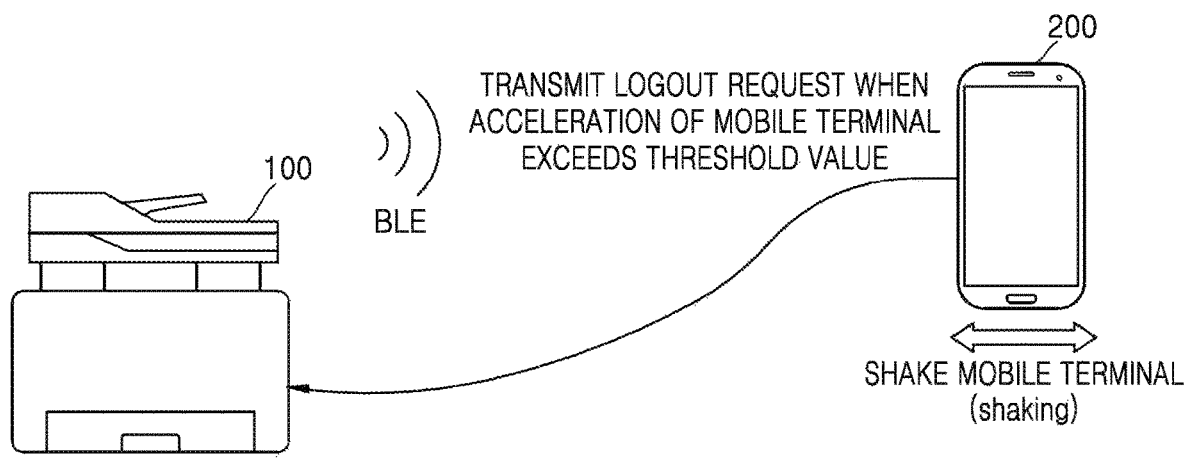
FIG. 12 shows a method of performing an automatic logout according to an acceleration size of a mobile terminal, according to an example.

FIG. 12 shows a method of performing an automatic logout according to an acceleration size of a mobile terminal, according to an example.

Referring to FIG. 12, when the user performs a preset action corresponding to an automatic logout, for example, an action of shaking the mobile terminal 200, the acceleration of the mobile terminal 200 may instantaneously increase and thus may exceed a threshold value. Therefore, the mobile terminal 200 may monitor the acceleration thereof by using an acceleration sensor. When the acceleration exceeds a preset threshold value, the mobile terminal 200 may automatically transmit a logout request to the image forming apparatus 100.

Figure 13:
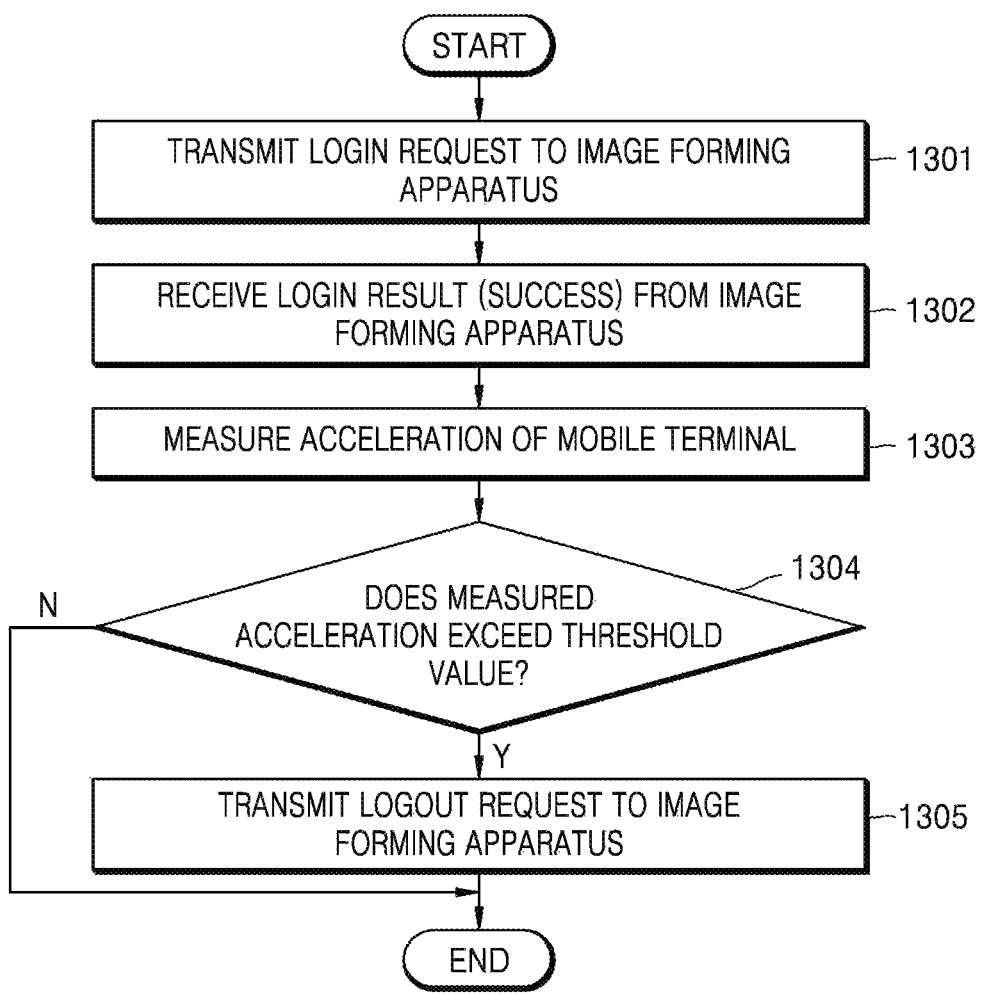
FIG. 13 is a flowchart of operations performed by a mobile terminal to perform an automatic logout according to an acceleration size of the mobile terminal, according to an example.

FIG. 13 is a flowchart of operations performed by a mobile terminal to perform an automatic logout according to an acceleration size of the mobile terminal, according to an example.

Referring to FIG. 13, in operation 1301, the mobile terminal transmits a login request to the image forming apparatus, and in operation 1302, the mobile terminal receives a login result (i.e., success) from the image forming apparatus.

In operation 1303, the mobile terminal measures the acceleration of the mobile terminal by using the acceleration sensor included in the mobile terminal, and in operation 1304, the mobile terminal determines whether the measured acceleration exceeds a preset threshold value.

As a result of the determination, when the acceleration of the mobile terminal exceeds the threshold value, the mobile terminal transmits a logout request to the image forming apparatus in operation 1305.

In the above examples described with reference to FIGS. 6 to 13, values that become control criteria may be appropriately set or changed by a user or an administrator, according to situations and necessity. For example, the user or the administrator may set or change an interval in which the advertising packets are received, a sampling rate of measuring the signal strength, a certain period of time when the signal strength should decrease, a threshold value of the acceleration, and the like.

Hereinafter, examples of performing an automatic logout when a response packet that the mobile terminal transmits to the image forming apparatus is not received for a certain period of time will be described with reference to FIGS. 14 to 16.

Figure 14:
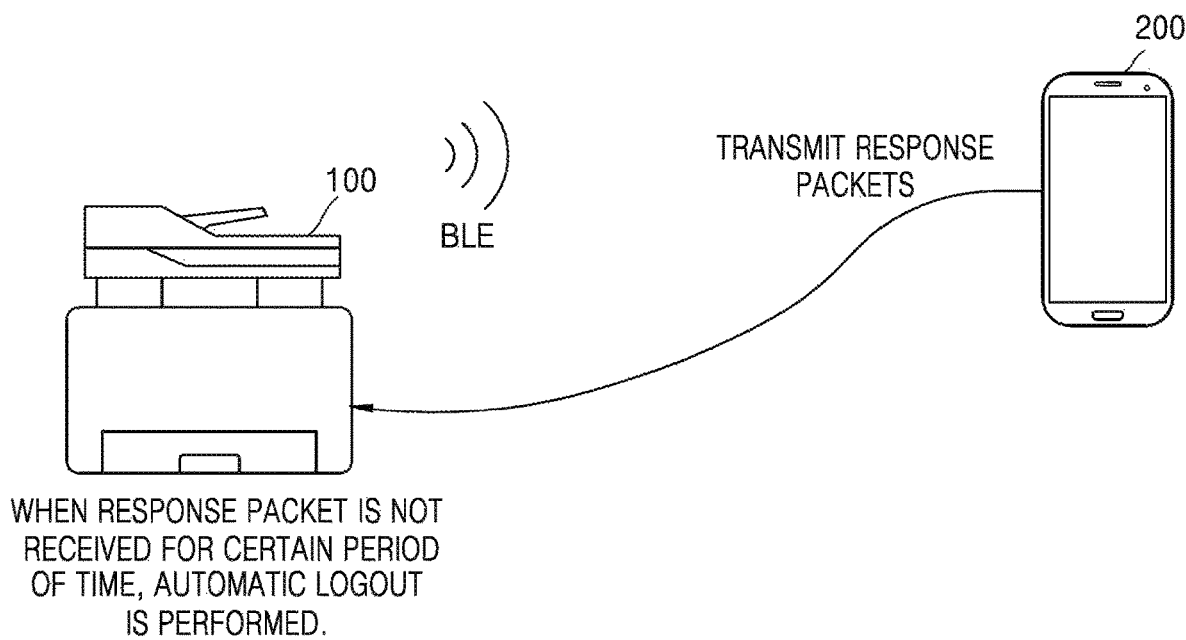
FIG. 14 shows a method of performing an automatic logout when an image forming apparatus fails to receive a response packet from a mobile terminal for a certain period of time, according to an example.

FIG. 14 shows a method of performing an automatic logout when an image forming apparatus fails to receive a response packet from a mobile terminal for a certain period of time, according to an example.

Referring to FIG. 14, the image forming apparatus 100 performing BLE communication periodically broadcasts the advertising packets and in response thereto, the image forming apparatus 100 receives response packets from the mobile terminal 200. When a distance from the mobile terminal 200 to the image forming apparatus 100 increases by a certain distance, or when the mobile terminal 200 is turned off, the image forming apparatus 100 may not receive a response packet. Thus, the image forming apparatus 100 may not receive a response packet from the mobile terminal 200 for a certain period of time. In that case, the image forming apparatus 100 may perform an automatic logout. Alternatively, when the image forming apparatus 100 does not receive a response packet from the mobile terminal 200 for a certain period of time, the image forming apparatus 100 may display, on the screen of the input/output unit 110, an inquiry asking whether to log out, and when the user selects the logout through the inquiry, the image forming apparatus 100 may perform the logout.

Figure 15:
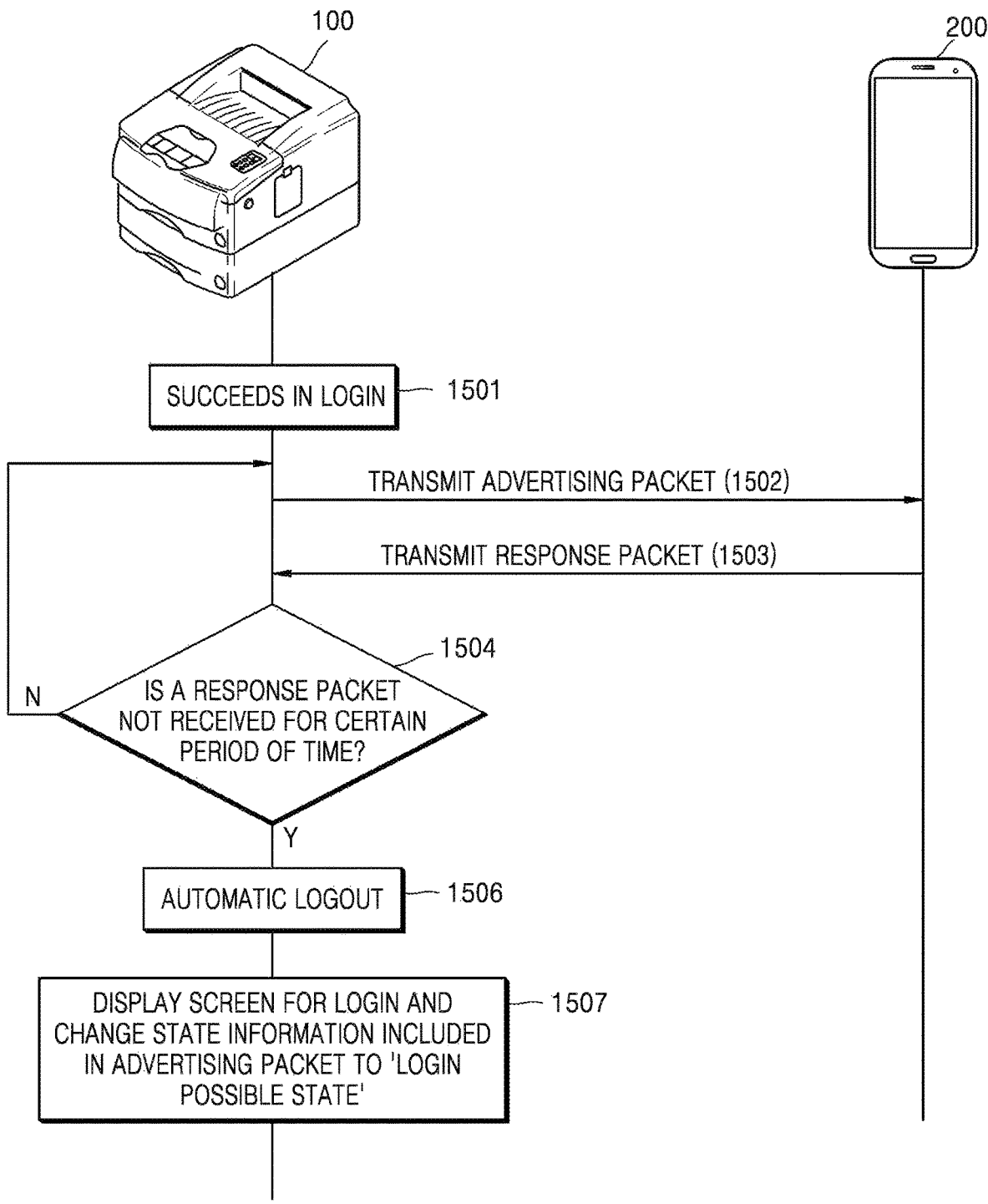
FIG. 15 shows operations of performing an automatic logout when an image forming apparatus fails to receive a response packet from a mobile terminal for a certain period of time, according to an example.

FIG. 15 shows operations of performing an automatic logout when an image forming apparatus fails to receive a response packet from a mobile terminal for a certain period of time, according to an example.

Referring to FIG. 15, in operation 1501, login succeeds in the image forming apparatus 100.

In operation 1502, the image forming apparatus 100 periodically broadcasts the advertising packets, and in operation 1503, the mobile terminal 200 transmits the response packets to the image forming apparatus 100 as responses to the advertising packets.

In operation 1504, the image forming apparatus 100 determines whether a response packet is not received from the mobile terminal 200 for a certain period of time. For example, a timeout is set in advance, and a time elapsing from a point in time when a response packet is received from the mobile terminal 200 is measured. When a response packet is received again from the mobile terminal 200, the timeout is refreshed, and then an elapsed time is measured again. When the elapsed time is greater than the timeout, operation 1506 is performed.

In operation 1506, the image forming apparatus 100 performs an automatic logout. Alternatively, the image forming apparatus 100 may display, on the screen of the input/output unit 110, an inquiry asking whether to log out, and when an answer to the inquiry is received or an answer is not received for a certain period of time, the logout may be performed.

In operation 1507, the image forming apparatus 100 displays, on the input/output unit 110, a screen for the login, changes state information included in advertising packets to a "login possible state," and broadcasts the advertising packets.

Figure 16:
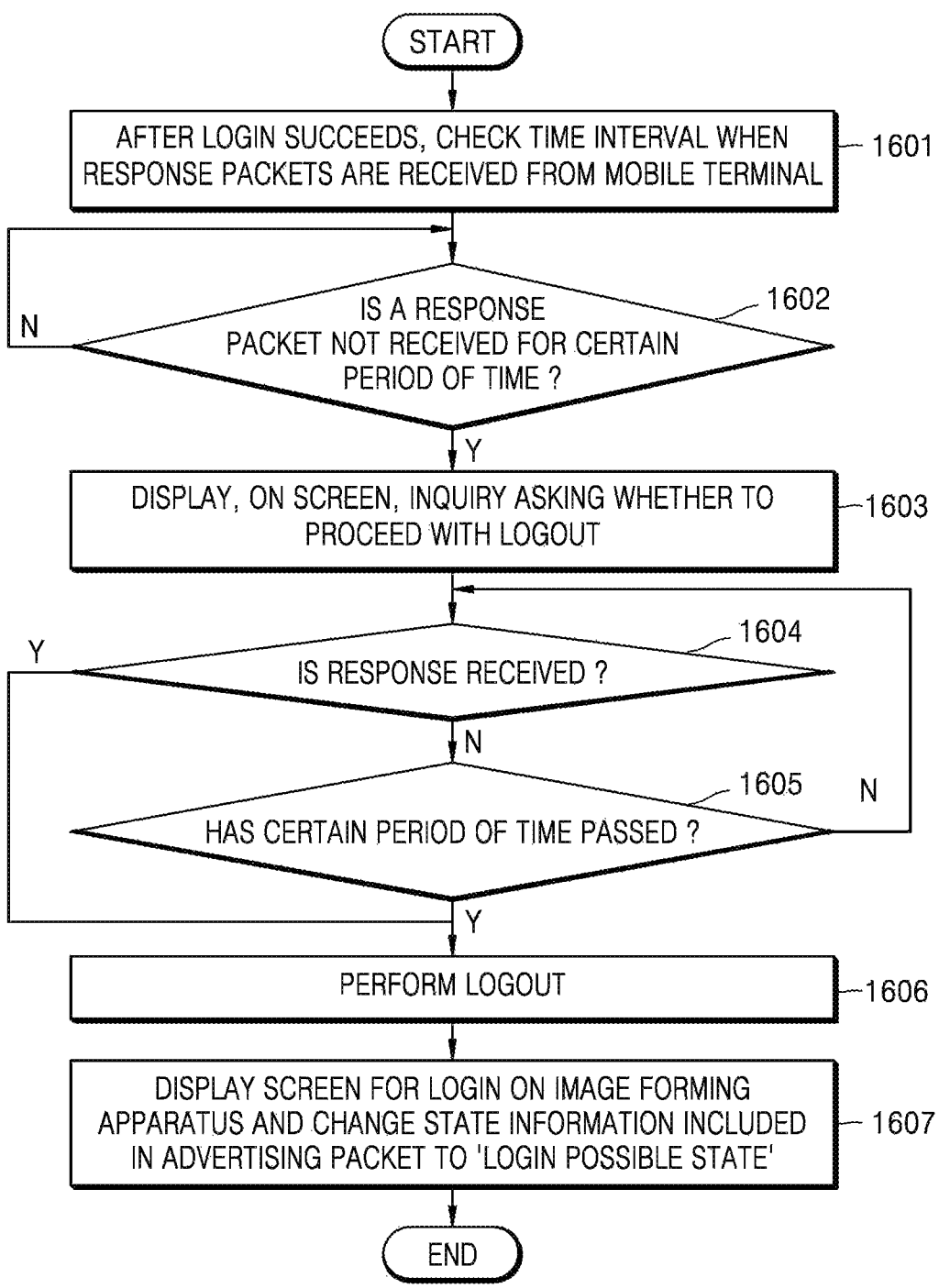
FIG. 16 is a flowchart of operations performed by an image forming apparatus to perform an automatic logout when the image forming apparatus fails to receive a response packet from a mobile terminal for a certain period of time, according to an example.

FIG. 16 is a flowchart of operations performed by an image forming apparatus to perform an automatic logout when the image forming apparatus fails to receive a response packet from a mobile terminal for a certain period of time, according to an example.

Referring to FIG. 16, in operation 1601, after the login succeeds, the image forming apparatus determines a time interval when a response packet is received from the mobile terminal, and in operation 1602, the image forming apparatus determines whether a response packet is not received for a certain period of time.

As a result of the determination, when a response packet is not received for a certain period of time, the image forming apparatus displays, on a screen of an input/output unit of the image forming apparatus, an inquiry asking whether to proceed with the logout, in operation 1603.

In operation 1604, the image forming apparatus determines whether a response to the inquiry asking whether to log out is received. As a result of the determination, when the response is received, operation 1606 is performed, and the image forming apparatus performs the log out. However, when the image forming apparatus does not receive the response, operation 1605 is performed, and the image forming apparatus determines whether a preset period of time, that is, a timeout, has passed. When a certain period of time has passed without receiving a response from the image forming apparatus, operation 1606 is performed, and the image forming apparatus performs the logout.

In operation 1607, the image forming apparatus displays a screen for the login, changes state information included in the advertising packets to a "login possible state," and broadcasts the advertising packets.

In the examples described with reference to FIGS. 14 to 16, the values that are the control criteria may be appropriately set or changed by the user or administrator, according to situations and necessity. For example, the user or administrator may set or change a certain period of time that is compared with a period when the response packets are not received from the image forming apparatus.

The above examples may be embodied as instructions executable by a computer on a non-transitory computer-readable recording medium storing data. At least one of the instructions and data may be stored as program codes, and when executed by a processor, the at least one of the instructions and data may generate a program module and perform a certain operation.

The non-transitory computer-readable recording medium may be, for example, a magnetic storage medium such as hard disk, an optical recording medium such as a CD-ROM or a DVD), and the like, or may be memory included in a server accessible via a network. For example, the computer-readable recording medium may be the memory 240 of the mobile terminal 200.

While one or more examples have been described with reference to the figures, it will be understood by those of ordinary skill in the art that various changes in form and details may be made therein without departing from the spirit and scope of the inventive concept as defined by the following claims. It should be understood that examples described herein should be considered in a descriptive sense only and not for purposes of limitation.

What is claimed is:

1. A method comprising:
   measuring, by a mobile terminal, a signal strength of advertising packets broadcast by an image forming apparatus;
   determining whether the measured signal strength decreases for at least a preset period of time; and
   when the signal strength decreases for at least the preset period of time, transmitting a logout request to the image forming apparatus.

2. The method of claim 1, wherein the measuring comprises:
   measuring the signal strength according to a preset sampling rate; and
   determining a representative value of the signal strength with respect to a preset cycle.

3. The method of claim 2, wherein the representative value of the signal strength comprises a value obtained by averaging two or more signal strengths measured with respect to each cycle.

4. The method of claim 2, wherein the representative value of the signal strength comprises a value obtained by averaging values remaining after a minimum value and a maximum value among three or more signal strengths, which are measured with respect to each cycle, are excluded.

5. The method of claim 2, wherein the representative value of the signal strength comprises a median among three or more signal strengths measured with respect to each cycle.

6. The method of claim 2, wherein the determining comprises determining whether a representative value with respect to each of consecutive cycles decreases for the preset period of time.

7. The method of claim 1, wherein the transmitting of the logout request comprises, when the signal strength decreases for at least the preset period of time, automatically transmitting the logout request to the image forming apparatus.

8. The method of claim 1, wherein the transmitting of the logout request comprises:
   when the signal strength decreases for at least the preset period of time, displaying, on a screen of the mobile terminal, an inquiry asking whether to proceed with logout; and
   when the logout request is received in response to the inquiry, transmitting the logout request to the image forming apparatus.

9. A non-transitory computer-readable recording medium having recorded thereon instructions for executing an automatic logout method, the non-transitory computer-readable recording medium comprising:
   instructions for measuring, by a mobile terminal, a signal strength of advertising packets broadcast by an image forming apparatus;
   instructions for determining whether the measured signal strength decreases for at least a preset period of time; and
   instructions for, when the signal strength decreases for at least the preset period of time, transmitting a logout request to the image forming apparatus.

10. A mobile terminal comprising:
    an input/output unit to receive a user input and display a screen;
    a communicator to receive/transmit data from/to an image forming apparatus;

a memory to store data; and a controller to:

measure a signal strength of advertising packets broadcast by the image forming apparatus, determine whether the measured signal strength decreases for at least a preset period of time, and transmit a logout request to the image forming apparatus when the signal strength decreases for at least the preset period of time.

11. The mobile terminal of claim 10, wherein the controller:

measures the signal strength according to a preset sampling rate, and determines a representative value of the signal strength with respect to a preset cycle.

12. The mobile terminal of claim 11, wherein the controller determines, as the representative value, a value obtained by averaging two or more signal strengths that are measured with respect to each cycle.

13. The mobile terminal of claim 11, wherein the controller:

excludes a minimum value and a maximum value among three or more signal strengths measured with respect to each cycle, and determines, as the representative value, a value obtained by averaging remaining values.

14. The mobile terminal of claim 11, wherein the controller determines, as the representative value, a median among three or more signal strengths measured with respect to each cycle.

15. The mobile terminal of claim 11, wherein the controller determines whether the representative value with respect to each of consecutive cycles decreases for at least the preset period of time.

* * * * *